Sept. 17, 1968   A. PALUSZNY ET AL   3,401,741
ROTARY HEAT EXCHANGER DRIVE ASSEMBLY
Filed Dec. 21, 1966   3 Sheets-Sheet 1

INVENTORS.
Antoni Paluszny
Armenag Topouzian
BY
John R. Faulkner
Robert E. McCollum
ATTORNEYS.

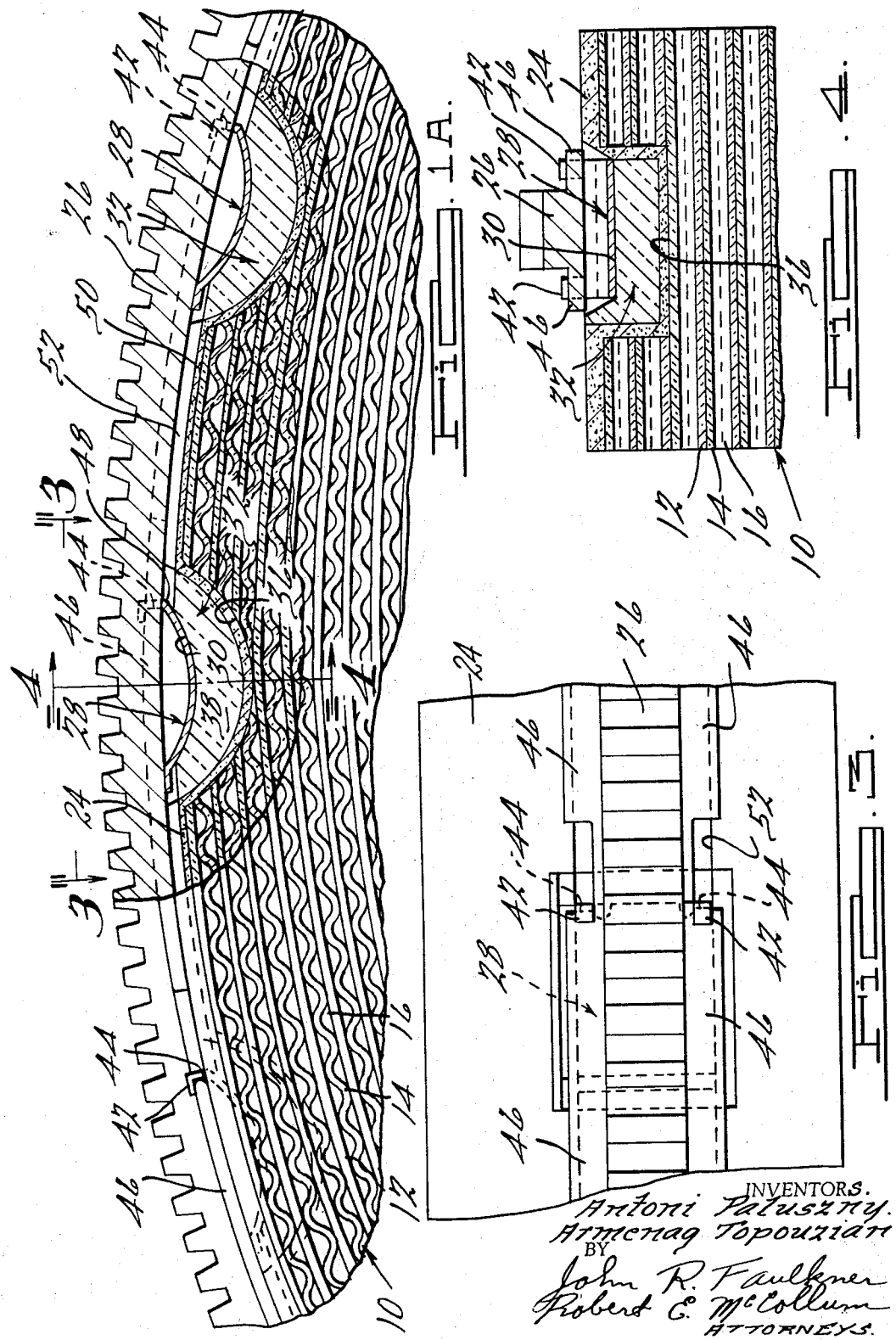

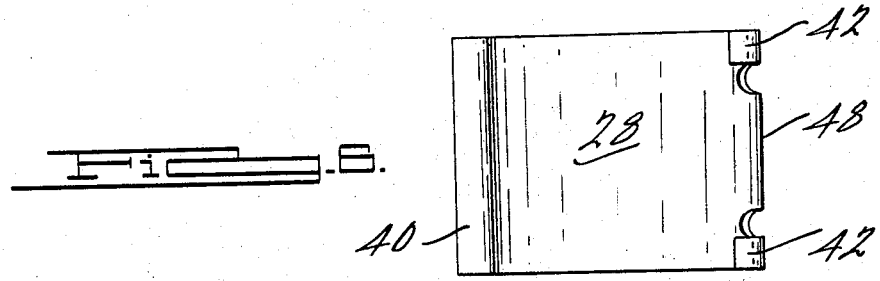
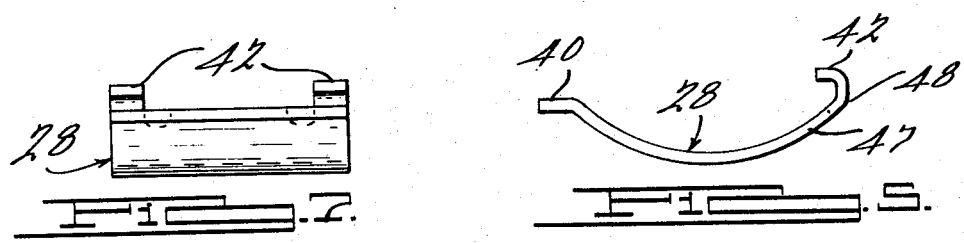
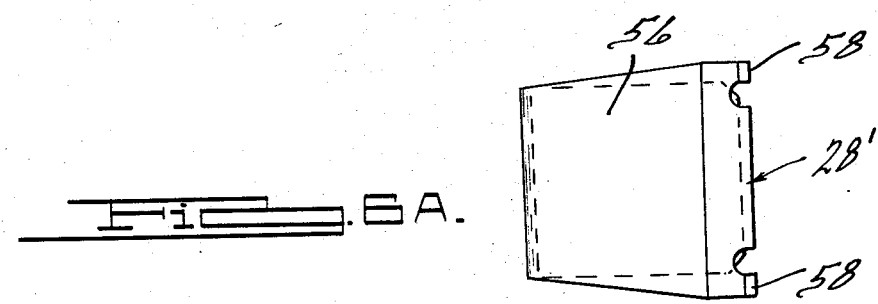
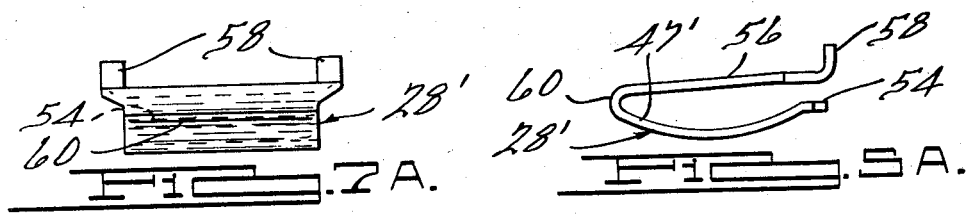
INVENTORS
Antoni Paluszny
Armenag Topouzian
BY
John R. Faulkner
Robert E. McCollum
ATTORNEYS

United States Patent Office 3,401,741
Patented Sept. 17, 1968

3,401,741
ROTARY HEAT EXCHANGER DRIVE ASSEMBLY
Antoni Paluszny, Ann Arbor, and Armenag Topouzian, Detroit, Mich., assignors to Ford Motor Company, Dearborn, Mich., a corporation of Delaware
Filed Dec. 21, 1966, Ser. No. 603,632
13 Claims. (Cl. 165—8)

ABSTRACT OF THE DISCLOSURE

A rimless rotary heat exchanger of the disc type having ceramic plugs buried in the peripheral face, the plugs having scalloped depressions frictionally containing spring metal clips hooked to a drive ring gear.

---

Figure 1:
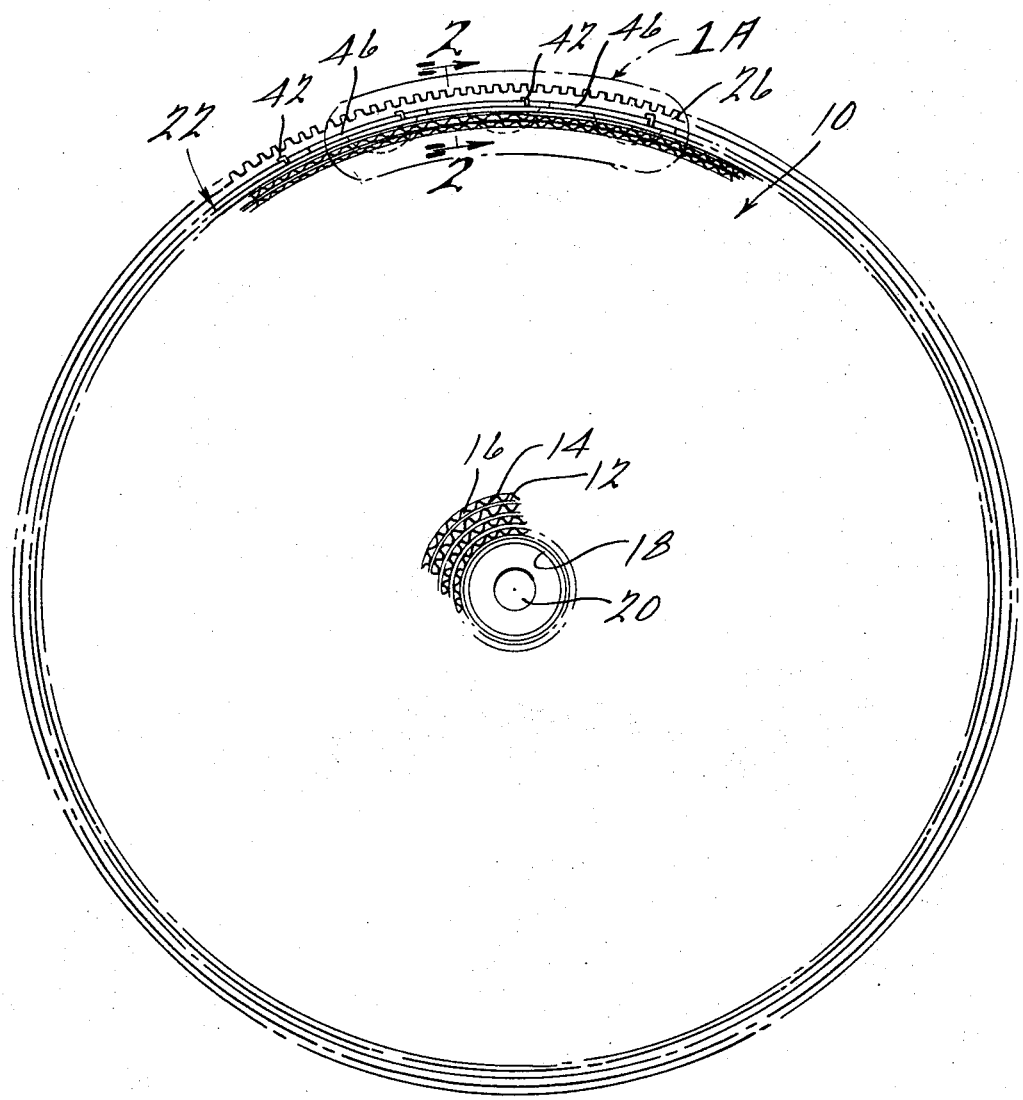

This invention relates, in general, to a rotary heat exchanger of the type commonly used in automotive gas turbine engines. More particularly, it relates to a rimless, ceramic rotary regenerator of the disc type to be driven by a metallic ring gear or the like.

The use of ceramic as the heat exchange material in a rotary regenerator has in the past few years become practical because of its ability to withstand high operating temperatures, and, therefore, permit higher maximum operating temperatures for an automotive type gas turbine engine. In this type of installation, however, it is still desirable that the regenerator be driven by metallic means such as the conventional ring gear. In prior constructions, therefore, regenerators of this type have been provided with a solid glass ceramic rim not only to bind the ceramic matrix together, but to provide a durable and strong attachment for the ring gear.

While theoretically, ceramic has essentially a zero coefficient of expansion, in practice, expansion of the ceramic does occur during changes from cold to hot operating phases. The conventional regenerator matrix section generally consists of radially alternating corrugated and flat thin glass ceramic strips secured together to provide radially sealed, axial flow passages. Therefore, if the matrix is surrounded by a solid ceramic rim, even though the coefficient of expansion of ceramic is extremely low, differential expansion does occur between the thin ceramic passage walls and the thick rim. This results ultimately in cracking of the rim and failure of the regenerator.

The invention eliminates the above disadvantages by providing a rimless ceramic regenerator that includes means for flexibly connecting the matrix to the metallic ring gear. More specifically, the invention provides a rimless ceramic matrix having a number of circumferentially spaced cement plugs buried in the matrix outer face in a manner to provide essentially uninterrupted side rubbing matrix seal face surfaces. Each of the plugs are scalloped to define a depression that is frictionally engaged by a flexible spring clip operably secured by tabs to the ring gear. The plugs are small enough that they heat at substantially the same rate as the ceramic matrix sections so that there is essentially no differential expansion between the two. Thus, cracking of the outer peripheral portion of the matrix is avoided.

Therefore, it is an object of the invention to provide a rimless ceramic rotary heat exchanger with suitable means for attaching the matrix to a drive member.

It is a further object of the invention to provide a rimless ceramic regenerator matrix including circumferentially spaced ceramic plug means buried in the matrix outer peripheral face, each of the plug means frictionally retaining spring-like connector means operably secured to a driving member.

It is a still further object of the invention to provide a means for operably interconnecting a rotary ceramic regenerator with an annular drive means in a manner permitting an overrunning connection between the two.

Figure 2:
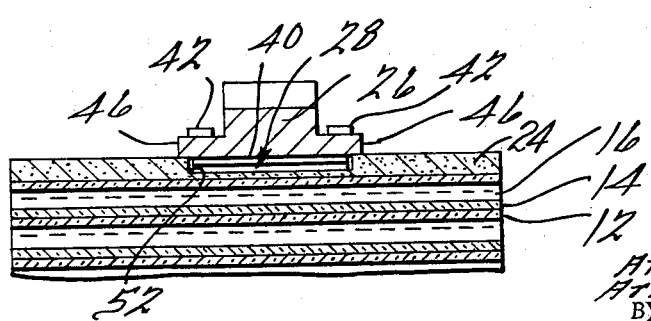

Other objects, features and advantages of the invention will become apparent upon reference to the succeeding detailed description thereof, and to the drawing illustrating the preferred embodiments thereof wherein:

FIGURE 1 is a side elevational view of a rotary, disc-type heat exchanger embodying the invention;
FIGURE 1A is an enlarged view of a portion of FIGURE 1, with parts broken away and in section;
FIGURE 2 is an enlarged cross-sectional view taken in the direction of the arrows 2—2 of FIGURE 1;
FIGURES 3 and 4 are plan and cross-sectional views, respectively, taken on planes indicated by and viewed in the direction of the arrows 3—3 and 4—4 of FIGURE 1A;
FIGURES 5, 6 and 7 are side, plan, and end elevational views, respectively, of a detail of FIGURE 1A; and,
FIGURES 5A, 6A and 7A are views corresponding to those of FIGURES 5, 6 and 7 illustrating a modification.

FIGURE 1 shows a disc-like rotary regenerator of the type commonly used in automotive gas turbine engines. It has a matrix section 10 that consists of a plurality of radially alternating, flat and corrugated ceramic strips 12 and 14, respectively. The strips are brazed or otherwise secured together to provide radially sealed, axial flow, fluid or gas passages 16. In assembly, the two strips can be spirally wound to the desired diameter, or the matrix can be formed in segments and joined together, in a known manner.

The matrix has an inner aperture 18, and is center mounted on a stationary shaft 20 by suitable bearing means, not shown. The bearing means could be similar to the swivel mount fully shown and described in my copending application Ser. No. 515,557, filed Dec. 21, 1965, entitled, Heat Exchange Assembly.

As discussed previously, it is known to provide a solid ceramic rim around the outer periphery of the matrix to radially seal the outermost corrugated strip, to bind the matrix sections together, if sections are used, and also to provide a base to which the ring gear drive means can be attached. However, such a construction promotes cracking of the thick ceramic rim upon differential expansion between the rim and thin strip portions of the matrix.

In the invention, as best seen in FIGURES 1 through 4, the matrix has a uniform cross-section from hub aperture 18 to the matrix outer periphery 22. At the outer peripheral portion, a thin coat of cement is applied around the circumference of the matrix to radially seal the outermost axial flow passages. For clarity, this thin cement coating is shown as much thicker than would be in actuality.

A conventional narrow metallic ring gear 26 constitutes the driving member for rotating the matrix. In general, it is secured to the matrix by a number of flexible spring clip means 28. The clips are preloaded upon assembly of the ring gear around the matrix to frictionally engage scalloped portions 30 provided in each of a plurality of ceramic cement plugs 32 buried within the outer face of the matrix.

More specifically, the outer cemented face of the matrix has a plurality of circumferentially spaced small recesses or depressions 36 of shallow extent and essentially crescent shape in cross-section. Each of these recesses is filled or plugged with ceramic, which then is scalloped to provide the depression 30 conforming to the arcuate shape of the lower portion of a flexible metallic spring clip 28. The plugs, in this case, could be, for example, solid round chunks of ceramic cemented into the face of the matrix and then ground off at the top to blend with the unbroken face of the matrix.

As best seen in FIGURES 5, 6 and 7, spring clip 28 at opposite ends includes a flat flange portion 40 and reversely bent or hook-like tab portions 42. The flat portion 40 is adapted to seat against a shoulder 43 (FIGURE 1A) in the thin layer of cement applied to the face of the matrix. The two axially spaced tabs 42 each are adapted to engage the rounded end 44 (FIGURE 1A) of a flange 46 extending laterally from opposite side of ring gear 26.

During assembly, spring clips 28 would be preloaded by the ring gear to provide a frictional engagement of the arcuate surface 47 of spring clip 28 with the plug 32 so that upon rotation of ring 26 in a clockwise direction, as viewed in FIGURE 1A, the matrix would be rotated in the same direction and at the same speed. It will also be clear, from the construction described, that because of the rounded-like edge 48 of clip 28, if for some reason the matrix encounters resistance to rotation, the clips can ride out of the scalloped plug portions 30 to ride on the matrix cemented face portion 50 from plug scallop to plug scallop. As best seen in FIGURES 1A and 3, the face of the matrix is provided with a groove that extends circumferentially between the plug scallops, to guide the clips in the above movement, the groove, of course, being of a radial depth less than that of the plug scallops.

Therefore, it will be clear that the clip design described provides an overrunning action of the ring gear with respect to the matrix if the matrix is unable to rotate, or to rotate at the same speed. This, of course, prevents damage to the matrix by reason of a forced rotation by the ring gear.

FIGURES 5A, 6A and 7A show an alternate form of spring clip for use when a more positive drive is desired between the matrix and ring gear. The clip 28' again has the lower arcuate plug frictional engagement surface 47', which, in this case, has a flat flange portion 54 at one end, and is reversely bent at its opposite end to provide an upper flat spring clip portion 56. Portion 56 is provided with a vertically extending pair of spaced ring gear engaging tabs 58. The upper spring portion 56, in this case, tapers laterally outwardly from bend 60 towards tab portions 58 to permit engagement of the tabs with the laterally projecting portions 46 of ring gear 26. The flat spring portion 54, in this case, would engage a shoulder portion of the cement on the outerface of the matrix in essentially the same manner as does flange 42 shown in FIGURE 2, but in a reverse direction.

The over-all operation of a rotary heat exchanger of the type described is known and is, therefore, not given. The specific operation of the invention is believed to be clear from the above description and from a consideration of the drawings, and, therefore, is not repeated.

From the foregoing, therefore, it will be seen that the invention provides a drive means for a ceramic type rimless rotary heat exchanger that permits the heat exchanger to be constructed with side sealing faces of a uniform cross-section, thereby providing better sealing while minimizing thermal distortion as compared to the conventional ceramic rotary regenerator having a solid ceramic rim. The ceramic plugs buried in the peripheral face of the matrix, and used to provide a connection of the matrix to the ring gear, are of small enough cross-sectional area that they heat up quickly so that the temperature gradient of the plugs is essentially the same as that of the ceramic strip sections of the matrix proper.

While the invention has been illustrated in its preferred embodiments, it will be clear to those skilled in the arts to which the invention pertains that many changes and modifications may be made thereto without departing from the scope of the invention.

We claim:

1. A drive assembly for a rimless rotary regenerator of the disc type comprising, a disc-like rotatable annular ceramic matrix of the axial fluid flow passage type, and rotatable drive means cooperating with a peripheral face of said matrix to rotate said matrix, said face having a plurality of circumferentially spaced recesses therein, and further means in said recesses operably engagable both with said face and said drive means for transmittal of said drive from said drive means to said matrix, said further means including ceramic-like plug means insertable into each of said recesses, each of said plug means having drive means connecting means.

2. A drive assembly as in claim 1, said drive means connecting means comprising spring clip means removably located in a recess in said plug means and engagable with said drive means.

3. A drive assembly as in claim 2, said drive means comprising a ring gear having clip means engagable portions.

4. A drive assembly as in claim 2, said face further including a circumferential groove extending between the recesses in said plug means, said clip means each having a frictional engagement with the plug means recess with which it is associated and being movable circumferentially relative to and out of said plug means recess into said groove upon a predetermined resistance to rotation of said matrix upon rotation of said drive means.

5. A drive assembly as in claim 1, said drive means connecting means comprising a depression in each of said plug means, and a spring clip insertable into each of said depressions, said spring clip having means thereon engagable both with said depression and said drive means.

6. A drive assembly as in claim 5, said spring clip means including tab means securing said clip means to said matrix.

7. A drive assembly as in claim 5, said spring clip means comprising a first clip means portion having a shape mating with that of said depression and being frictionally engaged therewith, and other clip means portions engagable with said drive means.

8. A drive assembly as in claim 7, said matrix face having a circumferentially extending groove interconnecting said depressions and of a radial depth from said face less than that of said depressions, said clip means being movable circumferentially out of said depression into said groove upon resistance to rotation of said matrix by said drive means to provide an overrunning connection between said drive means and matrix.

9. A drive assembly as in claim 1, including a thin coat of ceramic cement bonding said plug means to said matrix.

10. A drive assembly as in claim 1, said plug means each comprising a solid mass of ceramic cement.

11. A drive assembly as in claim 1, said drive means connecting means comprising spring clip means.

12. A drive assembly as in claim 2, said clip means each having a frictional engagement with the plug means recess with which it is associated and being movable circumferentially relative to and out of said plug means recess upon a predetermined resistance to rotation of said matrix upon rotation of said drive means.

13. A drive assembly as in claim 5, said depression having essentially a crescent shape in cross-section.

References Cited

UNITED STATES PATENTS

| 3,167,115 | 1/1965 | Chute | 165—7 |
| 3,301,317 | 1/1967 | Weaving et al. | 165—8 |
| 3,311,204 | 3/1967 | Barnard | 165—8 X |

FOREIGN PATENTS

| 975,776 | 11/1964 | Great Britain. |

ROBERT A. O'LEARY, *Primary Examiner.*

A. W. DAVIS, JR., *Assistant Examiner.*